Patented June 24, 1952

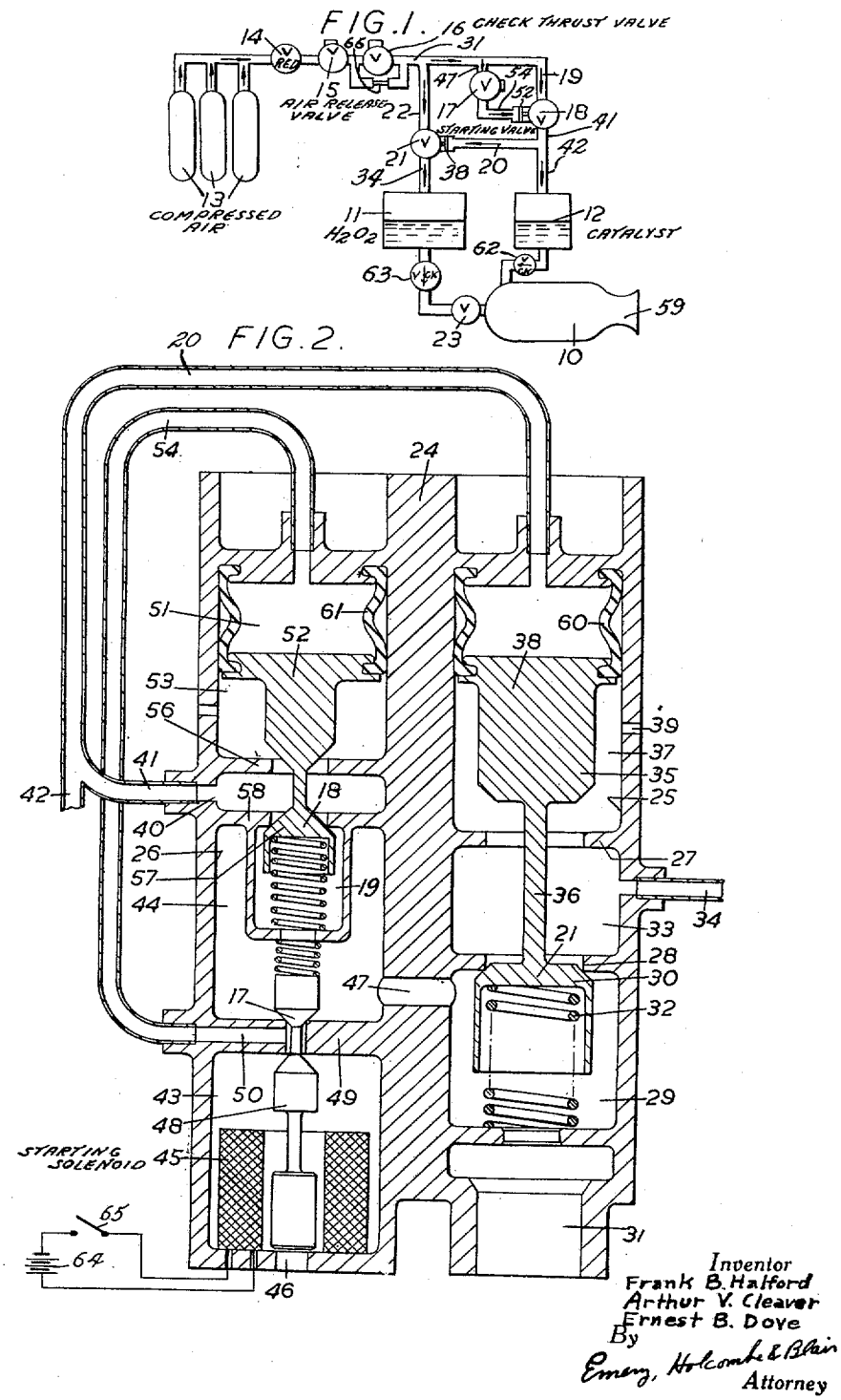

2,601,607

UNITED STATES PATENT OFFICE

2,601,607

PROPELLANT INJECTION SYSTEM FOR ROCKET MOTORS

Frank Bernard Halford, Edgware, Arthur Valentine Cleaver, London, and Ernest Baker Dove, East Barnet, England, assignors to The De Havilland Engine Company Limited, Stonegrove, Edgware, England, a company of Great Britain Application December 27, 1949, Serial No. 135,286
In Great Britain January 3, 1949

6 Claims. (Cl. 60—35.6)

This invention relates to rocket type propulsion apparatus of the kind which works on a "cold" system wherein a propellent liquid, for instance hydrogen peroxide, and a catalyst, for instance sodium or calcium permanganate, are forced by compressed air from separate reservoirs into a reaction chamber. The compressed air may of course be replaced by another compressed gas, and the term "compressed air" will be used for convenience as embracing either air or other suitable gases.

The catalyst causes the propellent liquid to dissociate into gaseous products which issue through a nozzle with propulsive effect. When starting such apparatus it is desirable that the propellent liquid should not enter the reaction chamber before the catalyst, since if an appreciable quantity of the propellent liquid should accumulate in the reaction chamber an explosion might occur when the catalyst is admitted.

In order to prevent such an occurrence it has been proposed to provide a pair of spring loaded distributor valves which, when the rocket is in operation, distribute compressed air to the propellent liquid and catalyst reservoirs respectively, the latter valve having a lighter spring than the former so that compressed air is admitted to the catalyst reservoir before the propellent reservoir.

This arrangement has the disadvantage that it would not prevent the propellent liquid from entering the reaction chamber before the catalyst in the event of the catalyst air distributor valve sticking. It is an object of the present invention to provide an arrangement which is not subject to this disadvantage.

According to the present invention a rocket type propulsion apparatus of the kind specified includes a catalyst air distributor valve which, when the rocket is to be started, is opened to admit compressed air to the catalyst reservoir to pressurize this reservoir and force catalyst into the reaction chamber, and also to a compressed air actuated propellent air distributor valve which is thereby opened to admit compressed air to the propellent reservoir.

Preferably the catalyst air distributor valve is also arranged to be actuated by the compressed air, both valves including operating chambers to which compressed air can be admitted to open the valves. With this arrangement a starting valve may be provided which, when the rocket is to be started, admits compressed air to the operating chamber of the catalyst air distributor valve, and a passage may be provided on the catalyst reservoir side of this distributor valve which communicates with the operating chamber of the propellent air distributor valve. The distributor valves, and if desired the starting valve as well, may be arranged in a common body or housing. The starting valve is preferably solenoid operated from a starting switch, but it may if preferred be operated in any other convenient manner.

When a distributor valve is closed the pressure of the compressed air upon it may serve to hold the movable member of the valve firmly on its seating and so maintain the valve in a closed condition.

Between the reservoirs and the reaction chamber non-return valves may be provided for the propellent liquid and catalyst. These non-return valves may be spring loaded, the catalyst non-return valve spring being lighter than the propellent non-return valve spring, so that the catalyst non-return valve opens more readily than the propellent non-return valve.

The apparatus of the present invention can readily be employed in conjunction with a control system for rocket apparatus as described in the present applicants' United States patent specification Serial No. 135,285 filed December 27, 1949. The control system described in that specification enables the operator to run the apparatus for testing purposes before bringing it into full operation in such a way that while the various valves function as in normal operation, the flow of propellent liquid and catalyst, and hence the thrust produced, is very much diminished.

The invention may be carried into effect in various ways but one particular arrangement will be described by way of example with reference to the accompanying drawing as applied to a rocket unit intended for installation in or attachment to an aircraft for assisting its take off. In the drawing:

Figure 1 is a diagram of the general arrangement of the rocket unit, and

Figure 2 is a diagrammatic cross section of one form of combined distributor valve and starting valve assembly.

The general arrangement and form of the rocket unit is described in United States patent specification Serial No. 135,282, filed December 27, 1949, in the names of Frank Bernard Halford and Arthur Valentine Cleaver. Broadly speaking, and as indicated in Figure 1, it consists of a reaction chamber 10 into which can be injected a main propellent, for instance hydrogen peroxide, from a reservoir 11, and a secondary propellent, for instance sodium or calcium permanganate which acts as a dissociation catalyst for hydrogen peroxide, from a reservoir 12. The liquids are injected by compressed gas, for instance air, which is stored in bottles 13.

The compressed air passes first through an automatic pressure reducing valve 14 and then through an on-off or air release valve 15 to a check thrust valve 16. The air release valve 15 may be a simple stop valve under the control of the pilot of the aircraft. The check thrust valve is also under the control of the pilot and has two operating positions. In one position it is fully open to permit free flow of compressed air from the air release valve into the rest of the apparatus, while in another position it permits only a limited flow through a small bore by-pass passage 66. After leaving the check thrust valve 16 it passes through passages 31 and 47 to a solenoid operated starting valve 17. When this starting valve is opened compressed air passes on through a pipe 54 to act on a piston 52 which opens a catalyst air distributor valve 18. This valve 18 allows compressed air to flow through a passage 19 and pipes 41 and 42 to enter and pressurize the catalyst reservoir 12 and so inject the catalyst through a check valve 62 and into the reaction chamber 10. A portion of the compressed air which has passed through the catalyst air distributor valve 18 flows along a pipe 20 and acts on a piston 38 which opens a hydrogen peroxide air distributor valve 21, thus allowing compressed air to flow through a pipe 34 and enter and pressurize the hydrogen peroxide reservoir 11 and so inject hydrogen peroxide into the reaction chamber 10 through a check valve 63 and an automatic injector valve 23 which is opened by the pressure of the peroxide behind it. The hydrogen peroxide thereupon dissociates producing propellent gases which issue from the nozzle 59 of the reaction chamber 10.

The starting valve 17 and the air distributor valves 18 and 21 are combined together in a single assembly as shown diagrammatically in Figure 2. The housing of the valve assembly consists of a casing 24 in which are two parallel bores 25 and 26, the bore 25 containing the hydrogen peroxide air distributor valve 21 and the other containing both the catalyst air distributor valve 18 and the starting valve 17. The bore 25 is divided by transverse partitions 27 and 28 into three chambers. The lowest chamber 29 contains a part 30 of the movable valve member of the hydrogen peroxide air distributor valve 21, and is continually open through passage 31 to the supply of compressed air from the check thrust valve 16. The compressed air will tend to hold the valve part 30 firmly on to a seating in the partition 28. A light spring 32 assists in holding the valve part 30 in this position.

The centre chamber 33 of the bore 25, which lies between the partitions 27 and 28, is in open communication with the hydrogen peroxide reservoir 11 through the pipe 34. A valve seating is formed in the partition 27 on which can seat another portion 35 of the movable valve member. The two parts 30 and 35 of the movable valve member are connected together by a stem 36, so that when one part is on its seating in one partition the other part is lifted clear of its seating in the other partition.

The upper chamber 37 of the bore 25, that is the chamber above the partition 27, acts as a cylinder for the piston 38 formed integral with the upper valve part 35 and is open to the atmosphere below the piston through a port 39. Thus when the movable valve member is in its upper position the centre chamber 33 and the hydrogen peroxide reservoir 11 are vented to the atmosphere. On the other hand when the movable valve member is in its lower position the aperture in the partition 27 is closed thus cutting off the communication between the hydrogen peroxide reservoir 11 and the atmosphere. At the same time compressed air enters the centre chamber 33 and the hydrogen peroxide reservoir from the lower chamber 29.

In the other bore 26 of the valve casing there is arranged the catalyst air distributor valve 18, the general arrangement of which is very similar to the hydrogen peroxide air distributor valve just described, but on a smaller scale. The centre chamber 40 of this valve is in open communication with the catalyst reservoir 12 through pipes 41 and 42. There is an additional chamber 43 in this bore arranged below the lower chamber 44 of the catalyst air distributor valve. The chamber 43 contains the solenoid 45 of the starting valve 17. Solenoid 42 is connected to a battery 64 through a starting switch 65. This chamber is vented to the atmosphere through a port 46. Passage 47 in the dividing wall between the bores 25 and 26 connects the lower chamber 29 of the hydrogen peroxide air distributor valve with the lower chamber 44 of the catalyst air distributor valve so that the latter chamber 44 is also in constant communication with the compressed air supply.

The movable member 48 of the starting valve works in a bore in a deep partition 49 between the chambers 43 and 44, and is of "hour-glass" form. There is a passage 50 in the partition 49 around the waist of the starting valve member 48 which is maintained in communication with the space 51 above the piston 52 in the upper chamber 53 of the catalyst air distributor valve through the pipe 54. When the starting switch 65 is opened and the starting valve member 48 is in a lower position, the space 51 is vented to the atmosphere through the pipe 54, the passage 50, and the port 46, while compressed air in the chamber 44 is prevented from entering the passage 50 and hence the space 51.

If, now, the starting switch 65 is closed and the solenoid 45 is energised, the starting valve member 48 is raised until its lower part seats on the lower edge of the partition 49. Compressed air can now pass from the chamber 44 through the passage 50 and the pipe 54 into the space 51 above the piston 52 of the catalyst air distributor valve. The piston 52 is thus forced downwards, causing the upper movable part 55 of the catalyst air distributor valve to close on to its seating in a partition 56, and causing the lower movable part 57 of this valve to be moved from its seating in a partition 58. The chamber 40 is thus closed off from communication with the atmosphere, and compressed air is admitted to it through the passage 19 from the chamber 44. Compressed air thus passes through the pipes 41 and 42 to the catalyst reservoir 12. The pipe 41 also communicates through the pipe 20 with the space above the piston 38 of the hydrogen peroxide air distributor valve. Thus, as soon as the air pressure has built up in the catalyst reservoir 12 and the injection of the catalyst has begun, the hydrogen peroxide air distributor valve will be actuated, allowing compressed air to pass from the lower chamber 29 to the centre chamber 33 and so to the hydrogen peroxide reservoir 11.

Thus the hydrogen peroxide reservoir 11 cannot be pressurised until pressure is first of all built up on the catalyst reservoir 12.

In order to stop the operation of the rocket, the switch 65 is opened and the solenoid 45 is de-energised, allowing the starting valve member 48 to fall and cut off the supply of compressed air to the upper chamber 51 of the catalyst air distributor valve. At the same time this upper chamber is vented to the atmosphere, so that the catalyst air distributor valve rises and vents the catalyst reservoir to the atmosphere. Thus injection of the catalyst ceases. The space above the piston 38 of the hydrogen peroxide air distributor valve is also vented to the atmosphere thus allowing the hydrogen peroxide air distributor valve to rise and to vent the hydrogen peroxide reservoir to the atmosphere.

The spaces above the pistons 38 and 52 are sealed by fluid seals 60 and 61 of the bellows type.

What we claim as our invention and desire to secure by Letters Patent is:

1. Rocket propulsion apparatus comprising a reservoir for a propellent liquid, a reservoir for a catalyst liquid, a reaction chamber, a propulsion nozzle extending rearwardly from said reaction chamber, a storage container for compressed air for pressurizing said reservoirs, separate liquid delivery conduits from said reservoirs to said reaction chamber, a propellent air distributor valve for regulating the admission of compressed air to the said propellent reservoir, a catalyst air distributor valve for regulating the admission of compressed air to said catalyst reservoir, and actuating means responsive to the air pressure in the catalyst reservoir for opening said propellent air distributor valve only when said catalyst reservoir has been pressurised by the compressed air.

2. Rocket propulsion apparatus as claimed in claim 1, which also includes two spring loaded non-return valves, one in each of said liquid delivery conduits, the spring of the non-return valve in the catalyst delivery conduit being lighter than the spring of the non-return valve in the propellent conduit.

3. Rocket propulsion apparatus comprising a reservoir for a propellent liquid, a reservoir for a catalyst liquid, a reaction chamber, a propulsion nozzle extending rearwardly from said reaction chamber, a storage container for compressed air for pressurizing said reservoirs, separate liquid delivery conduits from said reservoirs to said reaction chamber, a propellent air distributor valve for regulating the admission of compressed air to said propellent reservoir, an operating member associated with said propellent air distributor valve which opens said valve when compressed air is admitted thereto, a catalyst air distributor valve having an inlet side and an outlet side and arranged for regulating the admission of compressed air to said catalyst reservoir, an operating member associated with said catalyst air distributor valve which opens said catalyst air distributor valve when compressed air is admitted thereto, an air connection between the inlet side of said catalyst air distributor valve and its associated operating member, and a second air connection between the outlet side of said catalyst air distributor valve and the operating member associated with said propellent distributor valve.

4. Rocket propulsion apparatus comprising a reservoir for a propellent liquid, a reservoir for a catalyst liquid, a reaction chamber, a propulsion nozzle extending rearwardly from said reaction chamber, a storage container for compressed air for pressurizing said reservoirs, separate liquid delivery conduits from said reservoirs to said reaction chamber, a propellent air distributor valve for regulating the admission of compressed air to said propellent reservoir, a catalyst air distributor valve for regulating the admission of compressed air to said catalyst reservoir, pressure-sensitive actuating means for opening said propellent air distributor valve when subjected to a predetermined pressure, and a passage which places said pressure-sensitive actuating means in pressure communication with said catalyst reservoir whereby said pressure-sensitive actuating means opens said propellent air distributor valve only when air pressure in the catalyst reservoir has been built up to said predetermined value.

5. Rocket propulsion apparatus as claimed in claim 4, which also includes a starting valve which controls the supply of compressed air to the catalyst air distributor valve, pressure-sensitive actuating means for opening said catalyst air distributor valve when subjected to pressure, and a passage arranged to place said pressure-sensitive actuating means for said catalyst ir distributor vlve in pressure communication with said starting valve whereby said pressure-sensitive actuating means opens said catalyst air distributor valve when the starting valve has been opened.

6. Rocket propulsion apparatus as claimed in claim 5, in which there is a common housing for the said air distributor valves and said starting valve, and the said passages are formed in this common housing.

FRANK BERNARD HALFORD.
ARTHUR VALENTINE CLEAVER.
ERNEST BAKER DOVE.

REFERENCES CITED

The following references are of record in the file of this patent:

UNITED STATES PATENTS

| Number | Name | Date |
|---|---|---|
| 2,395,406 | Goddard | Feb. 26, 1946 |
| 2,398,201 | Young et al. | Apr. 9, 1946 |
| 2,406,926 | Summerfield | Sept 3, 1946 |
| 2,496,553 | Littlefield | Feb. 7, 1950 |
| 2,505,798 | Skinner | May 2, 1950 |
| 2,532,708 | Goddard | Dec. 5, 1950 |

OTHER REFERENCES

Journal of the American Rocket Society, No. 72, Dec. 1947, pages 28, 29, 47 and 48.